J. W. BELLAIRS.
ROCKING HORSE.
APPLICATION FILED NOV. 17, 1919.
1,339,493.
Patented May 11, 1920.
2 SHEETS—SHEET 1.
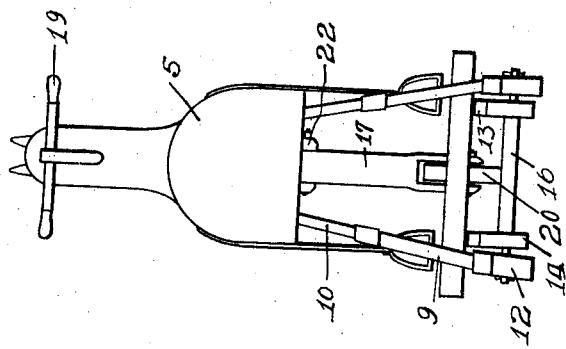
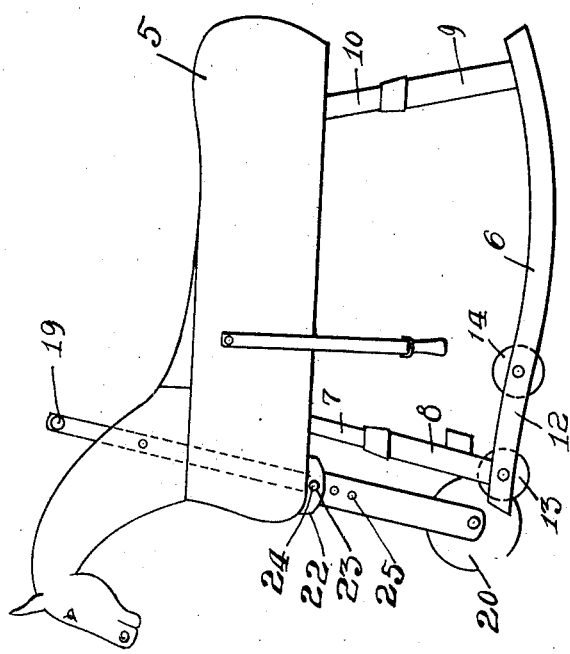
Witness
Inventor
J. W. Bellairs.
By C. A. Snow & Co.
Attorneys J. W. BELLAIRS.
ROCKING HORSE.
APPLICATION FILED NOV. 17, 1919.
1,339,493.
Patented May 11, 1920.
2 SHEETS—SHEET 2.
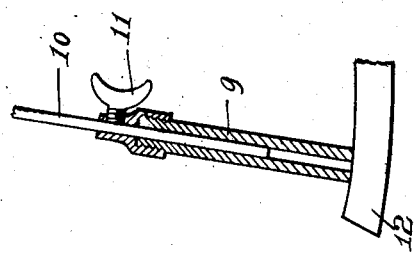
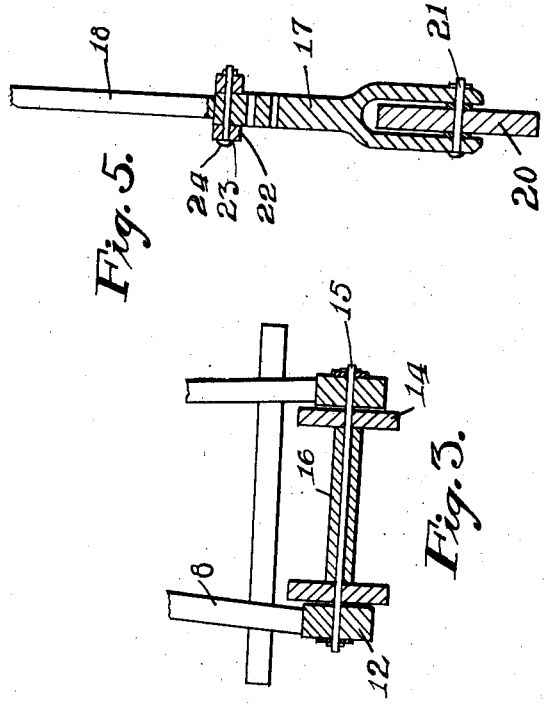
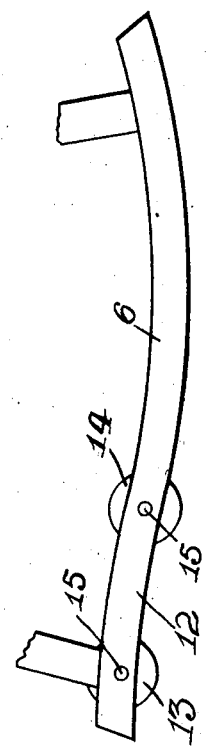
Inventor
J. W. Bellairs.
By C. A. Snow & Co.
Attorneys
Witness

UNITED STATES PATENT OFFICE.

JOHN WILLIAM BELLAIRS, OF MISHAWAKA, INDIANA.

ROCKING-HORSE.

1,339,493.  Specification of Letters Patent.  Patented May 11, 1920.

Application filed November 17, 1919. Serial No. 338,508.

*To all whom it may concern:*

Be it known that I, JOHN WILLIAM BELLAIRS, a citizen of the United States, residing at Mishawaka, in the county of St. Joseph and State of Indiana, have invented a new and useful Rocking-Horse, of which the following is a specification.

This invention has reference to new and useful improvements in amusement devices, and more particularly to devices known as rocking horses.

The primary object of the invention is to provide a rocking horse propelled over the surface on which the same is supported, by the momentum directed thereto, when the same is rocked in the usual and well known manner.

A further object of the invention is to provide a device of this character including wheels associated with the rockers, and disposed in such relation with the rockers that the device may be moved so that the same is supported by the wheels, to enable a person seated on the device to operate the same with his feet, by contact with the ground surface.

A further object of the invention is to provide means for steering the device, the steering means being actuated by the operator, seated on the device, and having access to the steering means, adjacent the forward portion of the device.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:—

Figure 1 illustrates a side elevational view of a rocking horse constructed in accordance with the present invention;

Fig. 2 illustrates a rear elevational view of the same;

Fig. 3 illustrates a fragmental sectional view taken through the rollers 14 and rockers.

Fig. 4 illustrates a fragmental elevational view of the rockers;

Fig. 5 illustrates a fragmental sectional view of the steering wheel and its support; and Fig. 6 illustrates a fragmental view of the adjusting mechanism employed in adjusting the device to various heights, the same being shown partly in section.

Referring to the drawings in detail, the reference character 5 designates the body of the device, which may be in the form of a horse, as illustrated, but it is to be understood that the body of the device may be changed in design to meet various requirements.

This body 5, is supported on the rockers 6, which are disposed in parallel relation with each other, as clearly shown by Fig. 2 of the drawings, and have connection with the body 5, through the medium of the supporting legs 7 and 8, disposed adjacent the ends of the rockers 6, and also supported in parallel relation with each other.

Each of the supporting legs includes a lower tubular portion 9, and an upper rod 10, the upper rod 10, has connection with the body 5, in any suitable manner, the lower end being constructed to be disposed within the tubular portion, there being means disposed adjacent the upper end of the tubular member, such as the winged screw 11, for contacting with the upper rod 10, for holding the sections of the supporting legs in proper adjusted relation with each other.

The rockers 6, which have connection with the lower extremities of the supporting legs, are curved adjacent the rear thereof, that is the curve of the rockers extend from one end thereof terminating at a point substantially intermediate the lengths of the rockers, the forward portions thereof extending in a substantially straight line as at 12, to support the wheels 13 and 14, which wheels are supported on the axles 15, and held in spaced relation with each other by means of the tubular member 16 disposed between the wheels, on the respective axles.

Due to the spaced relation, in which the wheels of the respective pairs are supported, it will be seen that the device may be tilted forward to throw the weight thereof to the wheels 13 and 14, and a person occupying the seat, may then by moving one of his feet, along the surface on which the device is supported, cause the device to be propelled.

A steering means including the forked arm 17, has its upper end 18, passing through a suitable opening formed through the forward portion of the body, the upper end thereof being provided with the cross arms 19, to be grasped by the operator so that the forked arm 17, may be rotated in a horizontal plane to accomplish the steering of the device, the wheels 20, supported between the forks of the arm 17, by means of the axle 21, contacts with the ground surface, whereby movement of the wheels 20, on the ground surface causes the wheels 13 and 14 to follow the course taken thereby.

Supported directly under the forward portion of the body 5, and constructed to rotate in an opening formed therein, is the collar 22, which is provided with an opening 23, in each of the side walls thereof, which openings are disposed diametrically opposite each other, to receive the adjusting pin 24, which pin 24 also passes through predetermined openings 25, of the arm 17. It will thus be seen that means is also provided for accomplishing the adjustment of the steering means to correspond with the adjustment of the leg portions 7 and 8.

If the device is to be used in a manner to simulate the movements of a horse or other animal in running action, it is only necessary for the operator to seat himself on the back, or body portion of the device, and rock the device in a manner similar to the rocking of the ordinary rocking horse, wherein no wheels are provided, with the result that the device moves forward, the weight thereof being supported by the wheels 13 and 14, the wheels, being caused to rotate under the momentum of the rock, with the result that the device rolls over the surface supporting the same. Upon movement to rock the device in an opposite direction, the same is stopped by engagement of the rockers with the surface and upon a rocking movement forward, the wheels again come into play with the result that the device again rolls on the wheels 13 and 14. In view of the foregoing it is obvious that the action of the device forming the subject matter of this invention, is similar to the action of a horse while running.

Having thus described the invention, what is claimed is:—

1. In a device of the class described, a body, parallel rocking elements, supporting the body, adjustable means providing connection between the body and rockers for securing the body to the rockers, wheel means for supporting the weight of the body, when the body is rocked forwardly, and means for guiding the body.

2. In a device of the class described, a body, parallel rocking elements supported by the body, wheel means supported adjacent the forward extremities of the rocking elements, a forked arm pivotally connected to the body, a steering wheel supported by the forked arm, means for rotating the steering wheel, and means for adjusting the steering wheel with relation to the body.

3. A device of the class described, a body, parallel rocking elements supported by the body, wheel means supported adjacent the forward extremities of the rocking element means disposed in front of the wheel means, for steering the device, and means for adjusting the steering means with relation to the body.

In testimony that I claim the foregoing as my own, I have hereto affixed my signature in the presence of two witnesses.

JOHN WILLIAM BELLAIRS.

Witnesses:
  F. H. HUBER,
  F. J. YENN.